(12) United States Patent
Onuki et al.

(10) Patent No.: US 8,052,531 B2
(45) Date of Patent: Nov. 8, 2011

(54) NETWORK GAME SYSTEM, GAME MACHINE, GAME MACHINE CONTROL METHOD, AND INFORMATION STORAGE MEDIUM

(75) Inventors: Katsunori Onuki, Minato-ku (JP); Ken Goto, Tokyo (JP); Shin Tsuchiya, Minato-ku (JP); Toshikazu Munemasa, Tokyo (JP); Takeshi Hasegawa, Saitama (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 772 days.

(21) Appl. No.: 12/093,807

(22) PCT Filed: Nov. 7, 2006

(86) PCT No.: PCT/JP2006/322188
§ 371 (c)(1),
(2), (4) Date: May 15, 2008

(87) PCT Pub. No.: WO2007/058089
PCT Pub. Date: May 24, 2007

(65) Prior Publication Data
US 2009/0270171 A1   Oct. 29, 2009

(30) Foreign Application Priority Data
Nov. 15, 2005   (JP) .................. 2005-330631

(51) Int. Cl.
A63F 9/24   (2006.01)

(52) U.S. Cl. .................. 463/42; 46/40; 46/20; 46/25

(58) Field of Classification Search .................. 463/20, 463/25, 40, 42
See application file for complete search history.

(56) References Cited

U.S. PATENT DOCUMENTS

| 5,685,775 | A | 11/1997 | Burhan et al. |
| 5,820,463 | A | 10/1998 | O'Callaghan |
| 6,128,644 | A | 10/2000 | Nozaki |
| 2002/0037767 | A1* | 3/2002 | Ebin .............................. 463/25 |
| 2002/0142843 | A1 | 10/2002 | Roelofs |
| 2002/0147047 | A1* | 10/2002 | Letovsky et al. ............... 463/42 |

(Continued)

FOREIGN PATENT DOCUMENTS

EP   1640047 A   3/2006

(Continued)

OTHER PUBLICATIONS

Extended European Search Report dated Oct. 24, 2008.

(Continued)

*Primary Examiner* — Peter DungBa Vo
*Assistant Examiner* — Brandon Gray
(74) *Attorney, Agent, or Firm* — Sughrue Mion, PLLC

(57) ABSTRACT

Provided is a network game system for providing a game played by players of game machines by operating at least one of the game machines as a server, in which: the game machine to be operated as a server can be appropriately selected; a measuring unit (22) of each of the game machines (12) measures a time required to exchange predetermined data between the game machine (12) and another game machine (12) of the game machines (12); and a server determining unit (28) determines at least one of the game machines (12) as the game machine (12) to be operated as the server according to the results of the measurement by the measuring units (22) of the game machines (12).

16 Claims, 8 Drawing Sheets

U.S. PATENT DOCUMENTS

| | | | |
|---|---|---|---|
| 2002/0165630 A1* | 11/2002 | Arthur et al. | 700/91 |
| 2004/0063479 A1* | 4/2004 | Kimura | 463/4 |
| 2004/0162870 A1 | 8/2004 | Matsuzaki | |
| 2006/0199644 A1 | 9/2006 | Hirota | |
| 2006/0205509 A1 | 9/2006 | Hirota | |
| 2008/0300046 A1* | 12/2008 | Gagner et al. | 463/25 |

FOREIGN PATENT DOCUMENTS

| | | |
|---|---|---|
| JP | 11-250020 A | 9/1999 |
| JP | 2000-342855 A | 12/2000 |
| JP | 2001-149658 A | 6/2001 |
| JP | 2002-109123 A | 4/2002 |
| JP | 2004-234648 A | 8/2004 |
| JP | 2004-260244 A | 9/2004 |
| JP | 2004-350910 A | 12/2004 |
| JP | 2005-137812 A | 6/2005 |
| TW | 575447 B | 2/2004 |

OTHER PUBLICATIONS

Japanese Office Action corresponding to Application No. 2007545200, dated Feb. 8, 2011.

* cited by examiner

10 : NETWORK GAME SYSTEM

| GAME MACHINE ID | PLAYER ID | TEAM ID | ACCESS INFORMATION | SERVER-CLIENT STATE FLAG |
|---|---|---|---|---|
| 1 | P 1 | A | ・・・ | 1 |
| 2 | P 2 | A | ・・・ | 0 |
| 3 | P 3 | B | ・・・ | 0 |
| 4 | P 4 | B | ・・・ | 0 |

| GAME MACHINE ID | RESPONSE TIME |
|---|---|
| 2 | ... |
| 1 | ... |
| 1 | ... |
| 1 | ... |
| 2 | ... |
| 1 | ... |
| 1 | ... |
| 1 | ... |
| 2 | ... |
| 1 | ... |
| 1 | ... |
| 1 | ... |
| 3 | ... |
| 3 | ... |
| 2 | ... |
| 2 | ... |

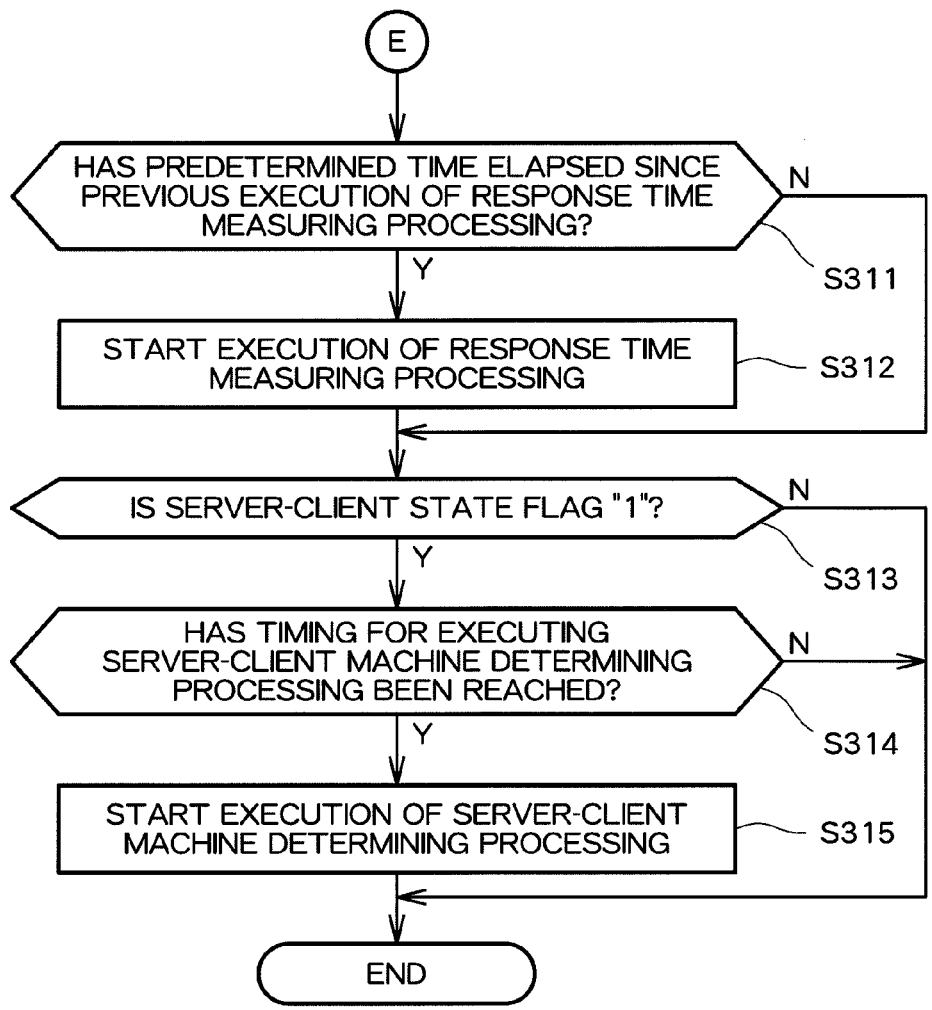

NETWORK GAME SYSTEM, GAME MACHINE, GAME MACHINE CONTROL METHOD, AND INFORMATION STORAGE MEDIUM

TECHNICAL FIELD

The present invention relates to a network game system, a game machine, a game machine control method, and an information storage medium.

BACKGROUND ART

There is known a network game system which includes a plurality of game machines and provides a game played by players that respectively correspond to the plurality of game machines by operating at least one game machine as a server. For example, there is known a network game system which operates any one of 4 game machines as a server-client machine that operates as a server and a client, and operates the other game machines as a client-dedicated machine that operates as a client without operating as a server, thereby realizing a soccer game, a Mahjong game, or the like played by participation of players that respectively correspond to the 4 game machines.

Patent Document 1: JP 2000-342855 A

DISCLOSURE OF THE INVENTION

Problem to be Solved by the Invention

In the above-mentioned network game system, various data is transmitted to a game machine operating as a server from the other game machines, while various data is transmitted from the game machine operating as a server to the other game machines, which enables the progress of a game. Therefore, for example, if the game machine connected to a communication network via a low-speed data communication line is operated as a server, data exchange with the other game machines may not be performed smoothly. As a result, there is a case where a player feels stress and cannot play the game in an enjoyable fashion. Therefore, in the above-mentioned network game system, in order to ensure that the player can enjoy the game, it is necessary to configure the game machine operating as a server to be adequately selected from among a plurality of game machines.

The present invention has been made in view of the above-mentioned problem, and an object thereof is to provide: a network game system for providing a game played by players that respectively correspond to a plurality of game machines by operating at least one of the plurality of game machines as a server, in which the game machine operating as a server can be configured to be adequately selected from among the plurality of game machines; a game machine; a game machine control method; and an information storage medium.

Means for Solving the Problem

In order to solve the above-mentioned problem, a network game system according to the present invention, which includes a plurality of game machines and provides a game played by players that respectively correspond to the plurality of game machines by operating at least one of the plurality of game machines as a server, is characterized in that: each of the plurality of game machines includes data exchange time measuring means for measuring a time required for exchanging predetermined data between the game machine and another one of the plurality of game machines; and the network game system further includes server determining means for determining at least one of the plurality of game machines as the game machine to be operated as the server based on a measurement result from the data exchange time measuring means of each of the plurality of game machines.

Further, a game machine according to the present invention, which is included in a network game system which includes a plurality of game machines and provides a game played by players that respectively correspond to the plurality of game machines by operating at least one of the plurality of game machines as a server, is characterized by including: data exchange time measurement result acquiring means for acquiring, for each of the plurality of game machines, a measurement result of a time required for exchanging predetermined data between the game machine and another one of the plurality of game machines; and server determining means for determining at least one of the plurality of game machines as the game machine to be operated as the server based on the measurement result acquired by the data exchange time measurement result acquiring means.

A control method for a game machine according to the present invention, which is included in a network game system which includes a plurality of game machines and provides a game played by players that respectively correspond to the plurality of game machines by operating at least one of the plurality of game machines as a server, is characterized by including: a data exchange time measurement result acquiring step of acquiring, for each of the plurality of game machines, a measurement result of a time required for exchanging predetermined data between the game machine and another one of the plurality of game machines; and a server determining step of determining at least one of the plurality of game machines as the game machine to be operated as the server based on the measurement result acquired by the data exchange time measurement result acquiring means.

A program according to the present invention causes a computer such as a personal computer, a home-use game machine, a portable game machine, an arcade game machine, a mobile phone, and a personal digital assistant (PDA) to function as a game machine included in a network game system which includes a plurality of game machines and provides a game played by players that respectively correspond to the plurality of game machines by operating at least one of the plurality of game machines as a server. The program further causes the computer to function as: data exchange time measurement result acquiring means for acquiring, for each of the plurality of game machines, a measurement result of a time required for exchanging predetermined data between the game machine and another one of the plurality of game machines; and server determining means for determining at least one of the plurality of game machines as the game machine to be operated as the server based on the measurement result acquired by the data exchange time measurement result acquiring means.

Further, an information storage medium according to the present invention is a computer-readable information storage medium recorded with the above-mentioned program. Further, a program delivery device according to the present invention is a program delivery device that includes an information storage medium recorded with the above-mentioned program and reads out the above-mentioned program from the information storage medium and delivers the above-mentioned program. Further, a program delivery method according to the present invention is a program delivery method for, while using an information storage medium recorded with the above-mentioned program, reading out the above-mentioned program from the information storage medium and delivering the above-mentioned program.

The present invention relates to a network game system which includes a plurality of game machines and executes a game played by participation of players that respectively correspond to the plurality of game machines by operating at least one of the plurality of game machines as a server. In the present invention, in each of the plurality of game machines, a time required for exchanging predetermined data between the game machine and another game machine of the plurality of game machines is measured. Then, based on respective measurement results of the plurality of game machines, at least one of the plurality of game machines is determined as the game machine that is operated as a server. According to the present invention, in the network game system for providing a game played by players that respectively correspond to a plurality of game machines by operating at least one of the plurality of game machines as a server, the game machine operating as a server can be configured to be adequately selected from among the plurality of game machines.

According to an aspect of the present invention, the data exchange time measuring means may include response requesting means for transmitting response request data to the other one of the plurality of game machines, each of the plurality of game machines may further include responding means for transmitting, upon reception of the response request data transmitted from the response requesting means of the other one of the plurality of game machines, response data corresponding to the response request data to the another game machine, and the data exchange time measuring means may measure a time elapsing from transmission of the response request data by the response requesting means until reception of the response data corresponding to the response request data.

According to another aspect of the present invention, measurement by the data exchange time measuring means may be executed a plurality of times, the network game system may further include statistical information acquiring means for acquiring statistical information of the measurement result from the data exchange time measuring means, and the server determining means may determine at least one of the plurality of game machines as the game machine to be operated as the server based on the statistical information acquired by the statistical information acquiring means.

According to a still further aspect of the present invention, a network game system may include game situation information storage means for storing game situation information indicating a situation of the game which is updated based on an operation content of each of the plurality of game machines, measurement by the data exchange time measuring means may be repeatedly executed after the game is started, and the server determining means may include: game situation judging means for judging whether or not the situation of the game is a predetermined situation after the game is started based on the game situation information stored in the game situation information storage means; server selecting means for selecting at least one of the plurality of game machines as the game machine to be operated as the server after the game is started based on the measurement result from the data exchange time measuring means of each of the plurality of game machines; and means for switching the game machine to be operated as the server into the game machine selected by the server selecting means if the game situation judging means judges that the situation of the game is the predetermined situation.

According to a still further aspect of the present invention, the game ends in the case where a time limit is reached after the game is started, and the network game system may further include: means for monitoring whether or not a remaining time before the game ends becomes equal to or less than a reference time; and means for limiting execution of switching of the game machine to be operated as the server if the remaining time before the game ends becomes equal to or less than the reference time.

According to a still further aspect of the present invention, each of the plurality of game machines may further include processing speed measuring means for measuring a processing speed of the game machine, and the server determining means may determine at least one of the plurality of game machines as the game machine to be operated as the server based on the measurement result from the data exchange time measuring means of each of the plurality of game machines and a measurement result from the processing speed measuring means of each of the plurality of game machines.

According to a still further aspect of the present invention, a network game system may include game result storage means for storing a game result of a past game in association with identification information for identifying the game machine or the player, and the server determining means may determine at least one of the plurality of game machines as the game machine to be operated as the server based on the measurement result from the data exchange time measuring means of each of the plurality of game machines and a storage content of the game result storage means.

According to a still further aspect of the present invention, a network game system may include communication disconnection count storage means for storing a communication disconnection count during a past game in association with identification information for identifying the game machine or the player, and the server determining means may determine at least one of the plurality of game machines as the game machine to be operated as the server based on the measurement result from the measuring means of each of the plurality of game machines and a storage content of the communication disconnection count storage means.

Further, according to an aspect of the present invention, the game may have a game character or a game character group corresponding to each of the plurality of game machines appearing therein, and the server determining means may include parameter comparing means for performing comparison, for each of the plurality of game machines, between an attribute parameter of the game character or the game character group corresponding to the game machine and an attribute parameter of the game character or the game character group corresponding to the another one of the plurality of game machines, and may determine at least one of the plurality of game machines as the game machine to be operated as the server based on the measurement result from the data exchange time measuring means of each of the plurality of game machines and a comparison result from the parameter comparing means.

BRIEF DESCRIPTION OF THE DRAWINGS

FIG. 10 is a flowchart showing the processing during the game.

FIG. 11 is a diagram showing an example of a game result information table.

FIG. 12 is a diagram showing an example of a communication disconnection count table.

BEST MODE FOR CARRYING OUT THE INVENTION

Hereinafter, detailed description will be given of an example of an embodiment of the present invention with reference to the drawings.

Figure 1:
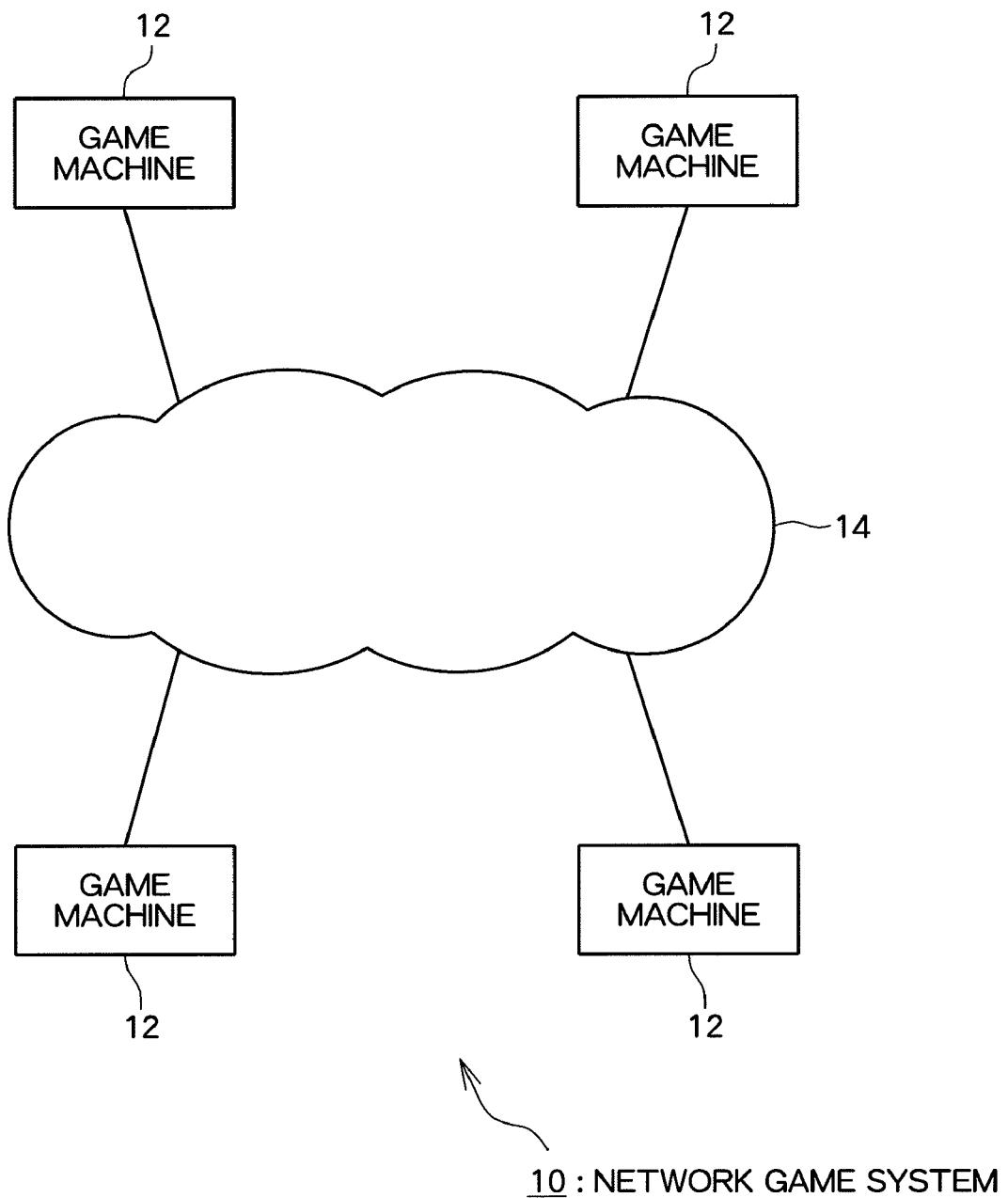
FIG. 1 is a diagram showing an overall configuration of a network game system according to this embodiment.

FIG. 1 is a diagram showing an overall configuration of a network game system according to the embodiment of the present invention. As shown in FIG. 1, a network game system 10 includes a plurality of game machines 12. The game machines 12 are each connected to a communication network 14 such as the Internet, and can exchange data with each other.

The game machine 12 is a computer system including a microprocessor, a main memory, a hard disk storage device, a disk reader, a communication interface, a timer unit, an operation unit, an image processing unit, and a monitor. Note that examples of the operation unit include a game controller and a mouse. The disk reader represents a device for reading a storage content of an optical disk (information storage medium) such as a DVD-ROM. The communication interface represents an interface for connecting the game machine 12 to the communication network 14. The image processing unit includes a VRAM, and draws a game screen in the VRAM based on image data transmitted from the microprocessor. The image processing unit then converts its content into a video signal and outputs the video signal to the monitor at a predetermined timing. The game machine 12 is constituted by, for example, a conventionally known machine such as a household game machine, a portable game machine, a mobile information terminal, a mobile phone, or a personal computer.

In the network game system 10 having the above-mentioned configuration, a shared game situation (game situation information) is built in the main memory of each of the game machines 12. Further, this shared game situation is updated based on the content of an operation performed on each of the game machines 12. Then, in the monitor of each of the game machines 12, a game screen showing the shared game situation is displayed. Accordingly, the network game system 10 is configured to realize a network game that is performed by a plurality of players participating simultaneously via the communication network 14.

In the network game system 10, the game machines 12 each have a server function and a client function. Herein, the server function represents a function for sharing the game situation held in each of the game machines 12. The server function includes, for example, a) a function of managing game situation information serving as a reference (primary game situation information), b) a function of updating the primary game situation information based on the contents of operations performed on the respective game machines 12, and c) a function of reflecting the update content on game situation information held in another game machine 12 (secondary game situation information). The client function includes, for example, a) a function of supplying the content of the player's operation to the server function, and b) a function of updating the game screen based on the game situation updated by the server function.

Further, in the network game system 10, each of the game machines 12 is operated as a client, while at least one of the game machines 12 is operated as a server. In other words, in the network game system 10, various information (including, for example, operation information and update information on the game situation) is exchanged between the server function of the at least one of the game machines 12 and the client functions of the respective game machines 12, thereby realizing the above-mentioned network game.

Herein, a state in which the game machine 12 operates as a server and a client is referred to as a server-client state, and the game machine 12 which is in the server-client state is referred to as a server-client machine. Also, a state in which the game machine 12 operates as a client and does not operate as a server is referred to as a client-dedicated state, and the game machine 12 which is in the client-dedicated state is referred to as a client-dedicated machine.

Hereinafter, description will be made of a technique for adequately determining a game machine to be operated as a server-client machine from among a plurality of game machines in the above-mentioned network game system 10.

Herein, the description will be given by taking an example case where a competitive soccer game played by participation of 4 players is provided by the network game system 10. Note that this competitive soccer game is constituted by a first half and a second half, in the same way as an actual soccer match. The first half or the second half ends when a time limit elapses after its start. The time limit corresponds to a time obtained by adding a predetermined base time and a time (injury time) determined based on the match situation. Further, in the example described herein, the players play the game on mutually different game machines 12. Further, teams are each operated by 2 players. Further, a shared game space in which soccer player characters of both the teams, a ball character, and the like are located is built in the main memory of each of the game machines 12. A game screen showing a situation of the shared game space is displayed on the monitor of each of the game machines 12.

In the network game system 10, processing for determining a server-client machine is executed before the game is started. For example, the processing for determining a server-client machine is executed before the first half or the second half of a match is started. Note that to execute the processing for determining a server-client machine, one of the game machines 12 is temporarily selected as the server-client machine.

Figures 2, 3:
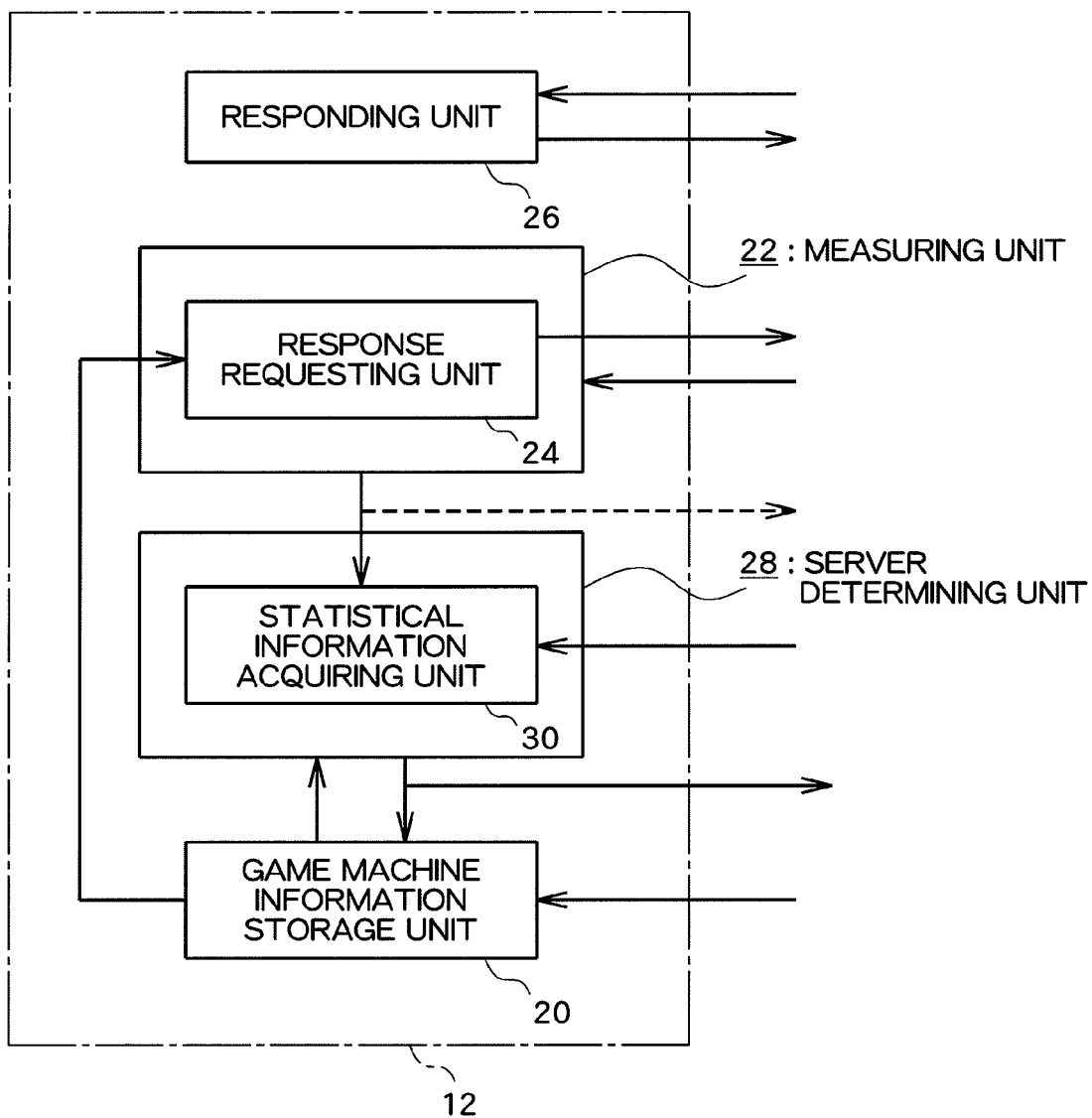
FIG. 2 is a functional block diagram of a game machine included in the network game system according to this embodiment.
FIG. 3 is a diagram showing an example of a game machine information table.

FIG. 2 is a functional block diagram showing functions implemented in each game machine 12 which are related to the processing for determining a server-client machine. As shown in this figure, the game machines 12 each include a game machine information storage unit 20, a measuring unit 22, a responding unit 26, and a server determining unit 28. Those functions are implemented by a game program being executed by each of the game machines 12, the game program being supplied via the information storage medium such as a DVD-ROM or via the communication network 14 such as the Internet.

[Game Machine Information Storage Unit]

The game machine information storage unit 20 is implemented mainly by the main memory of the game machine 12. The game machine information storage unit 20 stores information (game machine information) about each of the game machines 12. In the case of this embodiment, for example, such a game machine information table as shown in FIG. 3 is stored therein. As shown in this figure, the game machine information table contains a "game machine ID" field, a "player ID" field, a "team ID" field, an "access information" field, and a "server-client state flag" field. Stored in the "game machine ID" field is identification information (game machine ID) for uniquely identifying the game machine 12. Stored in the "player ID" field is identification information (player ID) for uniquely identifying the player. Stored in the "team ID" field is identification information (team ID) for identifying the team to be operated by the player. Stored in the "access information" field is access information (for example, IP address) for accessing the game machine 12. The contents of the "access information" field are referenced at the time of performing, for example, transmission of response request data by a response requesting unit 24, returning of response data by the responding unit 26, and transmission of operation information and game situation update information. Stored in the "server-client state flag" field is information (server-client state flag) for indicating whether or not the game machine 12 is in the server-client state. The server-client state flag takes the value "0" or "1". If the game machine 12 is not in the server-client state (if the game machine 12 is in the client-dedicated state), the server-client state flag is "0". On the other hand, if the game machine 12 is in the server-client state, the server-client state flag is "1".

As described later, the content stored in the game machine information storage unit 20 of the game machine 12 in the server-client state is updated by the server determining unit 28 of that game machine 12. The content stored in the game machine information storage unit 20 of the game machine 12 in the client-dedicated state is updated by the server determining unit 28 of the game machine 12 in the server-client state.

[Measuring Unit and Responding Unit]

The measuring unit 22 is implemented mainly by the microprocessor, communication interface, and timer unit of the game machine 12. The measuring unit 22 (data exchange time measuring means) measures a time required for exchanging predetermined data with other game machines 12.

In the case of this embodiment, the measuring unit 22 includes the response requesting unit 24. The response requesting unit 24 transmits response request data to other game machines 12. This response request data contains transmission time information indicating a transmission time.

The responding unit 26 is implemented mainly by the microprocessor and communication interface of the game machine 12. The responding unit 26 receives the response request data transmitted by the response requesting units 24 of other game machines 12. Upon receipt of the response request data, the responding unit 26 acquires the transmission time information from the response request data, and creates response data by containing the transmission time information. Then, the responding unit 26 returns the response data to the game machine 12 serving as a transmission source of the response request data.

The measuring unit 22 receives the response data returned by the responding units 26 of other game machines 12. Upon receipt of the response data, the measuring unit 22 calculates a response time based on the transmission time indicated by the transmission time information contained in the response data and the current time.

Figure 4:
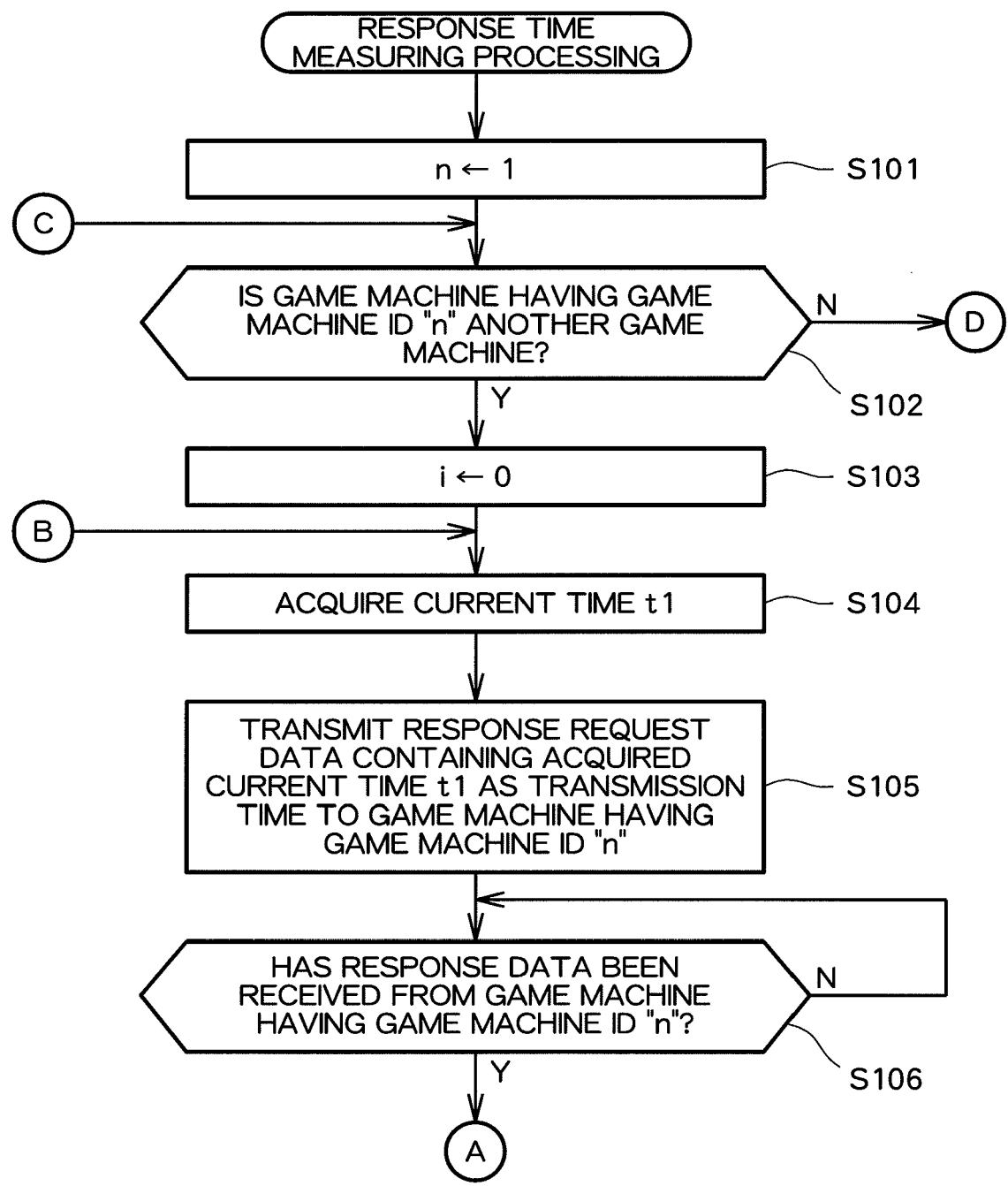
FIG. 4 is a flowchart showing response time measuring processing.
Figure 5:
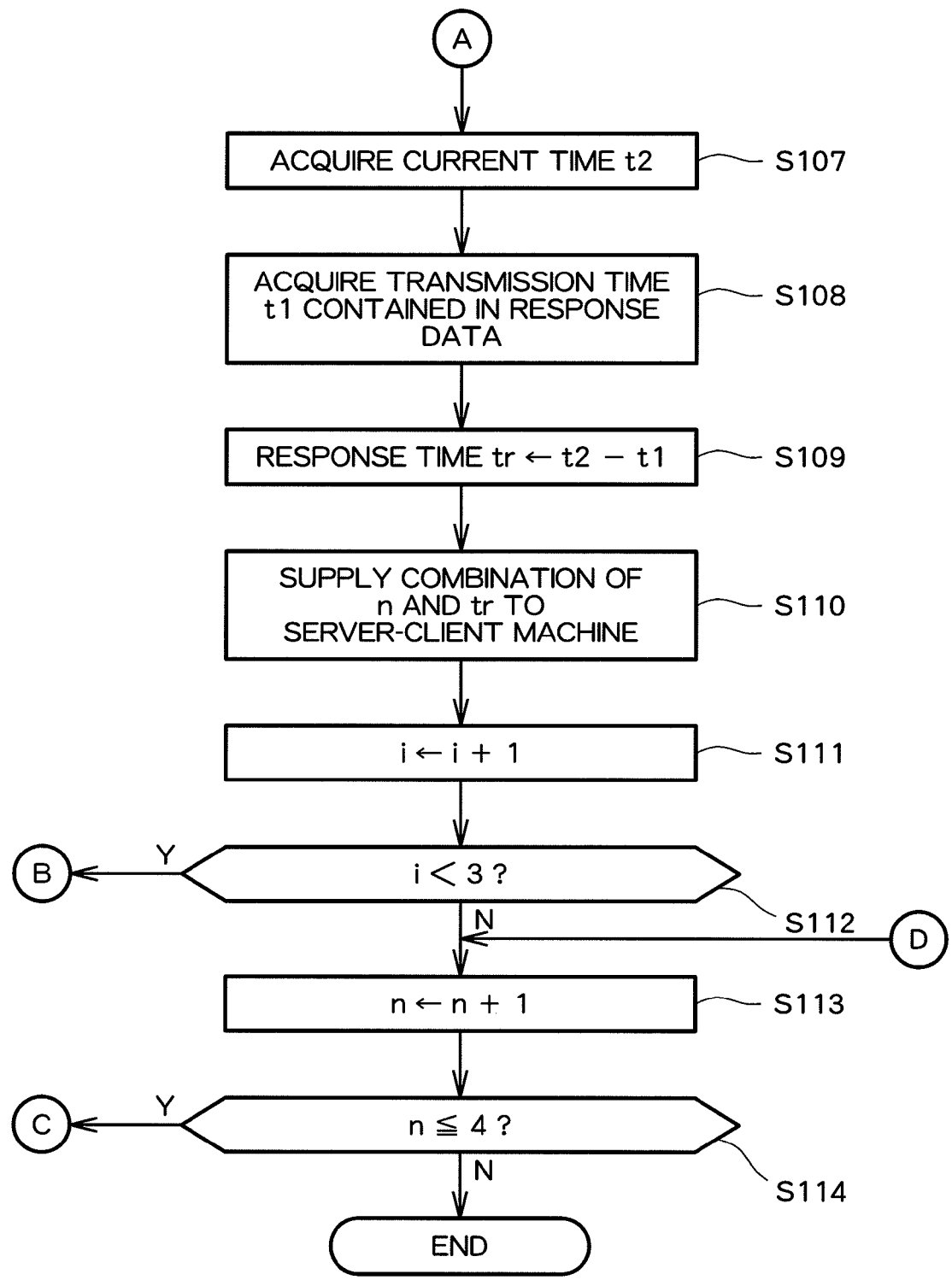
FIG. 5 is a flowchart showing the response time measuring processing.

Herein, further detailed description will be given of an operation of the measuring unit 22. FIGS. 4 and 5 are flowcharts showing a response time measuring processing executed on each of the game machines 12 mainly by the measuring unit 22. Note that this processing is executed on each of the game machines 12 irrespective of which of the server-client state and the client-dedicated state the game machines 12 is in. Further, the processing is implemented by, for example, a game program being executed on each of the game machines 12, the game program being read out from the information storage medium such as a DVD-ROM, or the game program being supplied via the communication network 14.

As shown in FIG. 4, in the response time measuring processing, the value of a variable n is initialized to "1" (S101). As described later, the variable n is used for indicating the game machine ID of the game machine 12 serving as a response request destination. Subsequently, it is judged whether or not the game machine 12 having the game machine ID "n" is another game machine 12 (S102). This judgment is performed to ensure that the response time measuring processing (S103 to S112) is never executed in a state where a response request source and the response request destination are the same game machine 12.

If the game machine 12 having the game machine ID "n" is another game machine 12, the value of a variable i is initialized to "0" (S103). Subsequently, a current time t1 is acquired (S104). Then, the response request data containing the current time t1 as the transmission time is transmitted to the game machine 12 having the game machine ID "n" (S105). After that, it is monitored whether or not the response data returned by the responding unit 26 of the game machine 12 having the game machine ID "n" has been received (S106).

Upon receipt of the response data, a current time (receiving time) t2 is acquired (S107). The transmission time t1 contained in the response data is also acquired (S108). A response time tr (tr=t2−t1) is then calculated (S109). After that, a combination of the values n and tr is supplied to the server determining unit 28 of the server-client machine (S110). Note that if the game machine 12 is in the client-dedicated state, the combination of the values n and tr is transmitted to the server determining unit 28 of the server-client machine via the communication network 14.

Accordingly, in this embodiment, the response time (tr) calculated by the measuring unit 22 of each of the game machines 12 is supplied to the server determining unit 28 of the game machine 12 in the server-client state, along with the game machine ID (n) of the game machine 12 serving as a transmission destination of the response request data (game machine of the response request destination). For example, a response time, which is calculated on the game machine 12 having the game machine ID "1" in the case where the response request data is transmitted from the game machine 12 having the game machine ID "1" to the game machine 12 having the game machine ID "2" and the response data is transmitted from the game machine 12 having the game machine ID "2" to the game machine 12 having the game machine ID "1", is supplied to the server determining unit 28 of the server-client machine, along with the game machine ID "2" of the game machine 12 that has made a response.

In the case where the processing of Step S110 is executed, the value of the variable i is incremented (S111), and it is judged whether or not the value is less than 3 (S112). In the case where the value of the variable i is less than 3, the processing of Steps S104 to S112 is executed again. In this embodiment, by the execution of the above-mentioned processing, the transmission of the response request data to the game machine 12 having the game machine ID "n" is repeated 3 times (predetermined number of times).

On the other hand, if the variable i is not less than 3, the value of the variable n is incremented (S113), and it is judged whether or not the value is 4 (the number of the game machines 12 involved in the game) or less (S114). In other words, it is judged whether or not the measurement of the response time has been completed by setting each of the rest of the game machines 12 as the response request destination. If the value of the variable n is 4 or less, the processing of Steps S102 to S114 is executed again. On the other hand, if the value of the variable n is not 4 or less, the response time measuring processing ends.

[Server Determining Unit]

The server determining unit 28 is implemented mainly by the microprocessor, main memory, and communication interface of the game machine 12. Based on the measurement results from the measuring units 22 of the respective game machines 12, the server determining unit 28 determines at least one of a plurality of game machines 12 as a server-client machine. Note that as described above, the measurement results from the measuring units 22 of the respective game machines 12 are supplied only to the server determining unit 28 of the game machine 12 in the server-client state. Therefore, only if the game machine 12 is in the server-client state, the server determining unit 28 (data exchange time measurement result acquiring means) acquires the measurement results from the measuring units 22 of the respective game machines 12, and determines the game machine 12 to be operated as a server-client machine.

[Statistical Information Acquiring Unit]

The server determining unit 28 includes a statistical information acquiring unit 30. The statistical information acquiring unit 30 acquires statistical information on the measurement results from the measuring units 22 of the respective game machines 12. The determination of the server-client machine is executed by the server determining unit 28 based on the statistical information acquired by the statistical information acquiring unit 30.

Figures 6, 7:
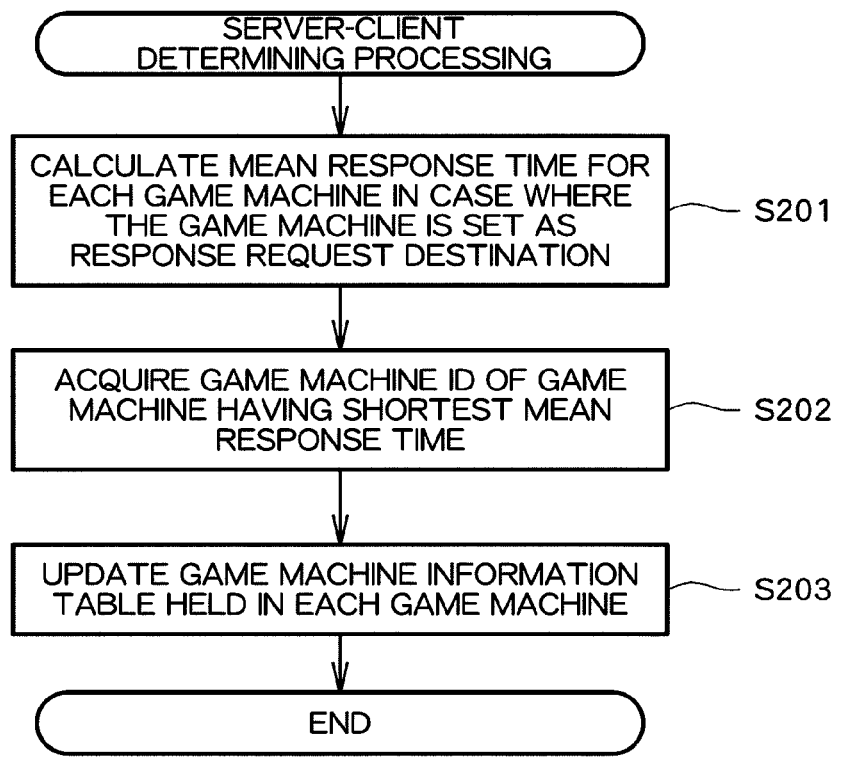
FIG. 6 is a diagram showing an example of a measurement result table.
FIG. 7 is a flowchart showing server-client machine determining processing.

In the case of this embodiment, in the statistical information acquiring unit 30, for example, such a measurement result table as shown in FIG. 6 is stored. As shown in this figure, the measurement result table shows a history of combinations of the game machine ID and the response time supplied from the measuring units 22 of the respective game machines 12. In the case where the processing of Step S110 is executed on each of the game machines 12 to supply the combination of the game machine ID (n) and the response time (tr) to the server determining unit 28 (statistical information acquiring unit 30) of the server-client machine, a record is newly added to the measurement result table, and the value of the game machine ID (n) is stored in the "game machine ID" field of the record, while the value of the response time (tr) is stored in the "response time" field. The determination of the server-client machine is executed based on the measurement result table.

Herein, further detailed description will be given of an operation of the server determining unit 28. FIG. 7 is a flowchart showing server-client machine determining processing which is executed mainly by the server determining unit 28.

Note that the processing is implemented by, for example, a game program being executed on each of the game machines 12, the game program being read out from the information storage medium such as a DVD-ROM, or the game program being supplied via the communication network 14.

As shown in FIG. 7, in the server-client machine determining processing, calculated for each of the game machines 12 is a mean value of the response time measured by the game machine 12 serving as a response request source in a case where the game machine 12 is set as a response request destination (S201).

To be more specific, based on the measurement result table held in the statistical information acquiring unit 30, a mean response time is calculated for each of the game machines 12 (for each of the game machine IDs). Herein, the mean response time of each of the game machines 12 represents an average of the response time measured by the game machine 12 serving as a response request source in the case where that game machine 12 is set as a response request destination. Therefore, the game machine 12 having a short mean response time can be assumed to be the game machine 12 that returns a relatively quick response, and is convenient for other game machines 12. In other words, the game machine 12 having a short mean response time can be assumed to the game machine 12 to be set as the server-client machine. Accordingly, in the case of this embodiment, the game machine 12 having the shortest mean response time is selected as the server-client machine.

To be more specific, in the server-client machine determining processing, the game machine ID of the game machine 12 having the shortest mean response time is acquired (S202). Then, in the game machine information table held in each of the game machines 12, the server-client state flag associated with the game machine ID is updated to "1", while the server-client state flags associated with the other game machine IDs are updated to "0" (S203). At this time, the game machine ID (game machine ID of the game machine 12 determined as a server-client machine) acquired in Step S202 is transmitted to the game machines 12 in the client-dedicated state. On the game machine 12 in the client-dedicated state, in the game machine information table, the "server-client state flag" field corresponding to the game machine ID has the value updated to "1", while the "server-client state flag" fields corresponding to the other game machine IDs updated to "0".

Note that in the network game system 10, the response time measuring processing (see FIGS. 4 and 5) is configured to be repeatedly executed at predetermined time intervals on each of the game machines 12 even after the start of the game. The server-client machine determining processing (see FIG. 7) is also configured to be executed at a predetermined time after the start of the game. In other words, even after the start of the game, the processing for determining the server-client machine is executed. Then, the game machine 12 whose server-client state flag has been updated to "1" by the server-client machine determining processing starts to operate as the server-client machine, while the game machine 12 whose server-client state flag has been updated to "0" by the server-client machine determining processing starts to operate as the client-dedicated machine. The network game system 10 is thus configured so that the server-client machine can be switched into another game machine 12 even during the game.

Figure 8:
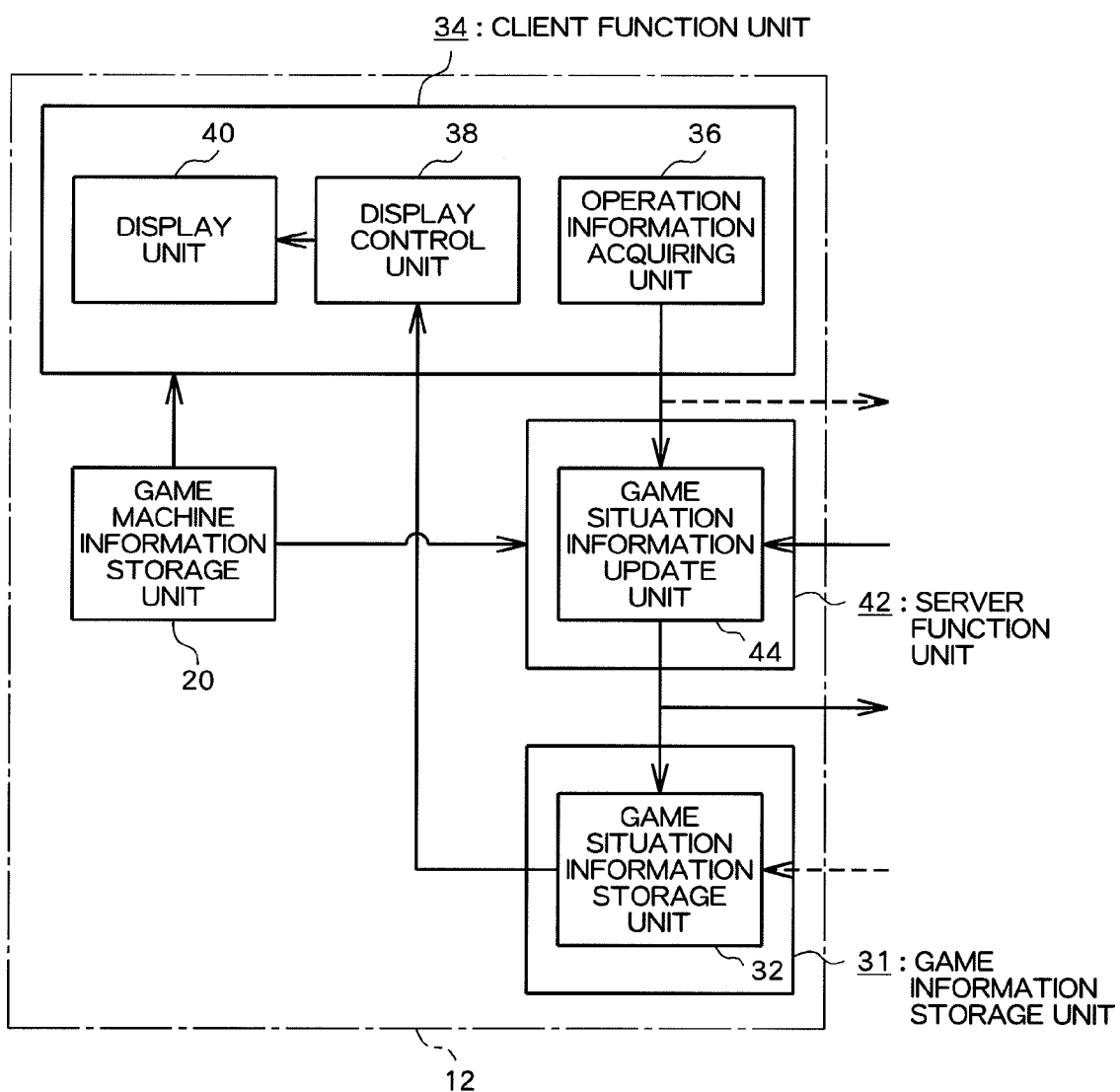
FIG. 8 is a functional block diagram of the game machine included in the network game system according to this embodiment.

Next, description will be given of function blocks relating to the execution of the game. FIG. 8 is a functional block diagram showing functions implemented in each game machine 12 which are related to the execution of the game. As shown in this figure, the game machines 12 each include the game machine information storage unit 20, a game information storage unit 31, a client function unit 34, and a server function unit 42. Those functions are also implemented by a game program being executed by each of the game machines 12, the game program being supplied via the information storage medium such as a DVD-ROM or via the communication network 14 such as the Internet.

[Game Information Storage Unit]

The game information storage unit 31 is implemented mainly by the main memory of the game machine 12 and an optical disk. The game information storage unit 31 stores various information relating to the game. The game information storage unit 31 stores, for example, the attribute parameter of a team and the attribute parameters of the soccer player characters belonging to each team. Examples of the attribute parameter of the team include, for example, numerical parameters of an attacking skill, a defending skill, and the like of the team. Further, examples of the attribute parameter of the soccer player character include, for example, numerical parameters of action capabilities (such as a dribbling skill, a passing skill, and a shooting skill) of the soccer player character.

[Game Situation Information Storage Unit]

The game information storage unit 31 includes a game situation information storage unit 32. The game situation information storage unit 32 is implemented mainly by the main memory of the game machine 12. The game situation information storage unit 32 stores game situation information that indicates the situation of a game. In the case of this embodiment, the game situation information represents information indicating, for example, states (such as a position, a posture, a moving direction, a moving speed, and an action type such as "dribbling", "passing", or "shooting") of each of the soccer player characters and states (such as a position, a moving direction, and a moving speed) of the ball character, the characters being located in the game space. The game situation information also represents information indicating, for example, states of a match such as scores of both teams and an elapsed time of the match.

As described later, the content stored in the game situation information storage unit 32 of the game machine 12 in the server-client state is updated by a game situation information update unit 44 of that game machine 12. On the other hand, the content stored in the game situation information storage unit 32 of the game machine 12 in the client-dedicated state is updated by the game situation information update unit 44 of the game machine 12 in the server-client state.

[Client Function Unit]

The client function unit 34 is a unit for implementing the client function of the game machine 12. The client function unit 34 includes an operation information acquiring unit 36, a display control unit 38, and a display unit 40.

[Operation Information Acquiring Unit]

The operation information acquiring unit 36 is implemented by including the operation unit of the game machine 12. The operation information acquiring unit 36 acquires operation information corresponding to the content of the player's operation based on an operation signal inputted from the operation unit.

Herein, the operation information represents information indicating, for example, the content of the player's operation judged based on the operation signal inputted from the operation unit. The operation information may also represent information indicating, for example, the operation signal itself inputted from the operation unit. The operation information may further represent information indicating, for example, an action instruction content issued to a player character to be operated. The action instruction content represents, for example, a dribble, a pass, or a shot, and is judged based on the operation signal inputted from the operation unit. As will be described later, the operation information is regarded as the basis for an update of the game situation information stored in the game situation information storage unit 32.

The operation information acquiring unit 36 supplies the acquired operation information to the game situation information update unit 44 of the server-client machine. In other words, the operation information acquired by the operation information acquiring unit 36 of the game machine 12 in the server-client state is supplied to the game situation information update unit 44 of the game machine 12 itself. The operation information acquired by the operation information acquiring unit 36 of the game machine 12 in the client-dedicated state is supplied to the game situation information update unit 44 of the game machine 12 in the server-client state via the communication network 14.

[Display Control Unit and Display Unit]

The display control unit 38 is implemented mainly by the image processing unit of the game machine 12. The display unit 40 is implemented mainly by the monitor of the game machine 12. The display control unit 38 generates a game screen based on the storage content of the game situation information storage unit 32, and causes the display unit 40 to display the game screen.

[Server Function Unit]

The server function unit 42 implements the server function of the game machine 12. The operation of the server function unit 42 is allowed on the server-client machine, but inhibited on the client-dedicated machine. The server function unit 42 includes the game situation information update unit 44.

[Game Situation Information Update Unit]

The game situation information update unit 44 is implemented mainly by the microprocessor of the game machine 12. The game situation information update unit 44 updates the storage contents of the game situation information storage units 32 of the respective game machines 12 based on the operation information supplied from the operation information acquiring units 36 of the respective game machines 12. For example, based on the operation information supplied from the operation information acquiring units 36 of the respective game machines 12, the game situation information update unit 44 updates the position and posture of the soccer player character to be operated by the player corresponding to the game machine 12. At this time, the attribute parameters of the soccer player character are read out, and the moving speed and the like of the soccer player character are set based on the attribute parameters.

In the case of this embodiment, in the game machine 12 in the server-client state, the game situation information update unit 44 updates the storage content of the game situation information storage unit 32 based on the operation information supplied from the operation information acquiring units 36 of the respective game machines 12. In the game machine 12 in the server-client state, the game situation information update unit 44 transmits the game situation update information to the other game machines 12 in order to reflect the update content in the storage contents of the game situation information storage unit 32 of the other game machines (in other words, client-dedicated machines). The game machine 12 in the client-dedicated state receives the game situation update information transmitted from the game situation information update unit 44 of the server-client machine, and the storage content of the game situation information storage unit 32 is updated based on the game situation update information.

Herein, for example, all or a part of the game situation information stored in the game situation information storage unit 32 is transmitted as the game situation update information. Alternatively, for example, information indicating the update content of the game situation information may be transmitted as the game situation update information.

Figure 9:
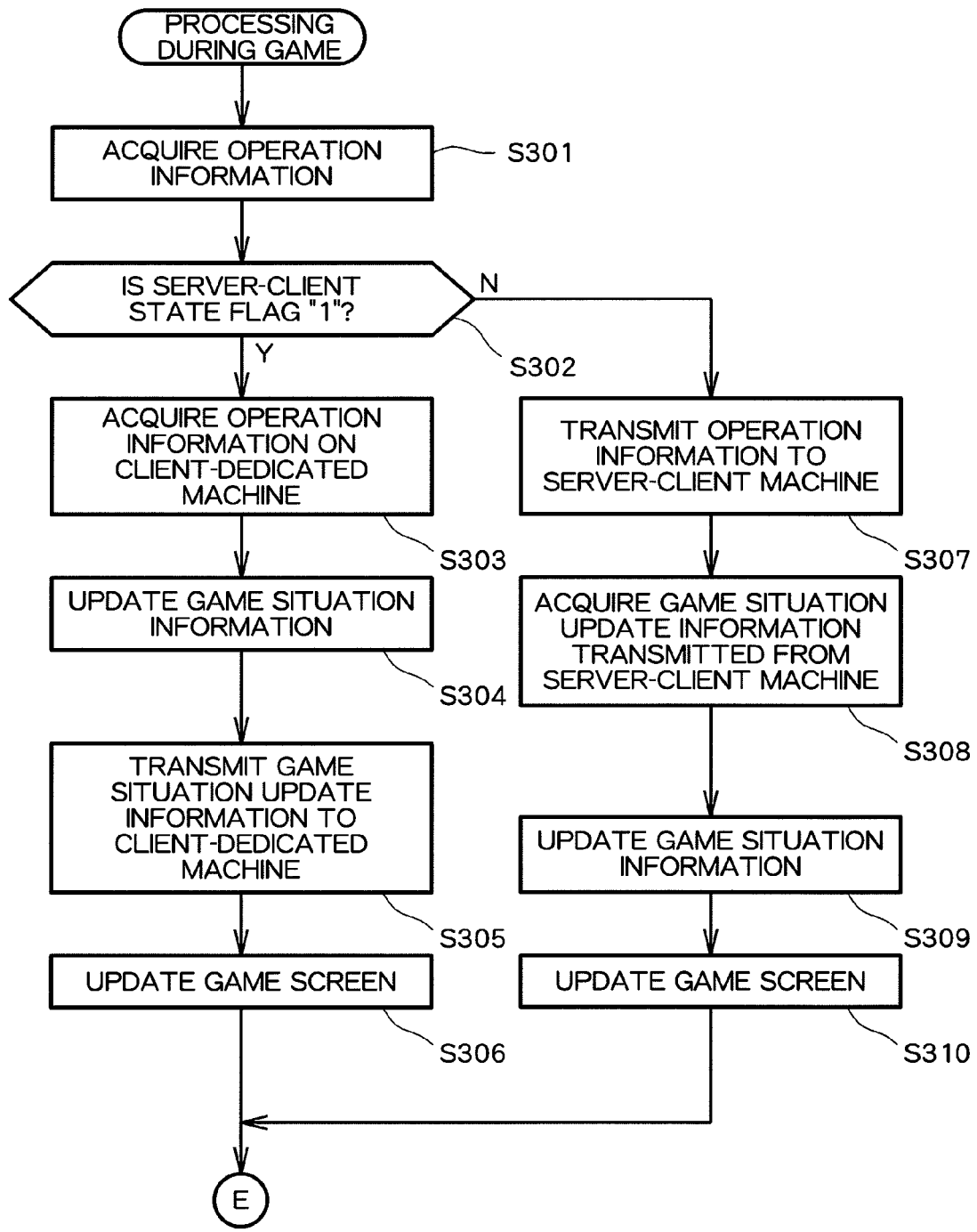
FIG. 9 is a flowchart showing processing during a game.

FIGS. 9 and 10 are flowcharts mainly showing processing executed on each of the game machines 12 every predetermined time (in this embodiment, ¹⁄₆₀th of a second) during a game and which is related to the present invention. The processing is implemented by, for example, a game program being executed on each of the game machines 12, the game program being read out from the information storage medium such as a DVD-ROM, or the game program being supplied via the communication network 14.

As shown in FIG. 9, on the game machine 12, the operation information acquiring unit 36 acquires the operation information indicating the content of the player's operation performed on the game machine 12 (S301). Subsequently, it is judged whether or not the server-client state flag of the game machine 12 is "1" based on the game machine information table stored in the game machine information storage unit 20 of the game machine 12 (S302).

If it is judged that the server-client state flag is "0", that is, if the game machine 12 is in the client-dedicated state, the processing of Steps S307 to S310 is executed. To be specific, on the game machine 12 in the client-dedicated state, the operation information acquired in Step S301 is transmitted to the game machine 12 in the server-client state (S307). Subsequently, the game situation update information transmitted from the game situation information update unit 44 of the server-client machine is acquired (S308). Then, based on the game situation update information, the game situation information stored in the game situation information storage unit 32 is updated (S309). After that, based on the game situation information stored in the game situation information storage unit 32, the game screen is generated in the VRAM (S310). The game screen formed in the VRAM is display-outputted to the monitor at a predetermined timing.

On the other hand, if the server-client state flag is judged to be "1", that is, if the game machine 12 is in the server-client state, the processing of Steps S303 to S306 is executed. To be specific, on the game machine 12 in the server-client state, the operation information transmitted from the operation information acquiring unit 36 of the game machine 12 in the client-dedicated state is acquired (S303). Then, the game situation information stored in the game situation information storage unit 32 is updated based on the operation information acquired in Step S301 and the operation information acquired in Step S303 (S304). Further, the game situation update information indicating the update content of the game situation information in Step S304 is transmitted to the client-dedicated machine (S305). After that, a game screen is generated in the VRAM based on the game situation information stored in the game situation information storage unit 32 (S306). The game screen formed in the VRAM is display-outputted to the monitor at a predetermined timing.

After the processing for updating the game screen of Step S306 or S310 has been executed, it is judged whether or not a predetermined time has elapsed since the previous execution of the response time measuring processing (S311). If the predetermined time has elapsed, the execution of the response time measuring processing is started (see FIGS. 4 and 5) (S312).

Further, after the execution of the response time measuring processing has been started, or if it is judged that the predetermined time has not elapsed since the previous execution of the response time measuring processing (N in S311), it is judged whether or not the server-client state flag of the game machine 12 is "1" (S313). This judgment is performed similarly to the case of Step S302.

On the game machine 12 in the server-client state, it is judged whether or not a time for executing the server-client machine determining processing (see FIG. 7) has been reached (S314). Herein, the phrase "time for executing the server-client machine determining processing" represents a time when even a change of server-client machines does not affect the execution of the game. In other words, the "time for executing the server-client machine determining processing" represents a time when the current situation of the game is such a predetermined situation as not to affect the execution of the game even when the server-client machine is changed. Thus, it is judged in S314 whether or not the current situation of the game is the above-mentioned predetermined situation. This judgment is made based on, for example, the game situation information stored in the game situation information storage unit 32. In the case of this embodiment, the "time for executing the server-client machine determining processing" is, for example, a time when the situation is shifted from an "in-play" state to an "out-of-play" state. Therefore, in Step S314, by judging whether or not the current situation of the game is in the "out-of-play" state, it is judged whether or not the current situation of the game has shifted from the "in-play" state to the "out-of-play" state. Note that the term "out-of-play" represents a case where the ball has passed the goal line or the touch line or a case where the referee has stopped the match due to a foul, an injured player, or the like. The term "in-play" represents a case where the situation is not the "out-of-play" state. It is judged whether or not the current situation of the game is in the "out-of-play" state based on, for example, the game situation information (including the position of the ball character) stored in the game situation information storage unit 32.

On the game machine 12 in the server-client state, if it is judged that the time for executing the server-client machine determining processing has been reached, the execution of the server-client machine determining processing is started (S315). After the completion of the server-client machine determining processing, the game machine 12 whose server-client state flag has been updated to "1" by the server-client machine determining processing starts to operate as a server-client machine, while the game machine 12 whose server-client state flag has been updated to "0" by the server-client machine determining processing starts to operate as a client-dedicated machine.

In the network game system 10 as has been described above, on each of the game machines 12, with the rest of the game machines 12 being set as the response request destination, calculation is made for a time which is required after the transmission of the response request data to the game machine 12 of the response request destination until receipt of the response data returned from the game machine 12 of the response request destination. In addition, the mean value of the response time measured by the game machine 12 serving as a response request source when that game machine 12 is set as a response request destination is calculated for each of the game machines 12. Then, the game machine 12 having the shortest mean response time is determined as the server-client machine. The above-mentioned game machine 12 having a short mean response time can be assumed as the game machine 12 that returns a relatively quick response, and is convenient for other game machines 12. In other words, the game machine 12 having a short mean response time can be assumed as the game machine 12 to be set as the server-client machine. Accordingly, according to the network game system 10, the game machine 12 judged to be more suitable based on the state of connection to the communication network 14 of each of the game machines 12, the communication state of the communication network 14, and the like, is selected as a server-client machine. As a result, it is ensured that the player can enjoy the game.

Further, in the network game system 10, the determination of the server-client machine as described above is repeatedly executed during the game. Therefore, even when the communication state of the communication network 14 varies during the game, the server-client machine is switched to the game machine 12 judged to be more suitable based on the situation after the variation, and the player can enjoy the game.

Note that the present invention is not limited to the above-mentioned embodiment.

For example, the execution of the switching of the server-client machine during the game may be limited in the case where the remaining time before the end of the first half or second half of the match becomes equal to or less than a reference time. The reference time may be a predetermined time or may be a time (for example, injury time) determined depending on the match situation.

In this mode, the game machine 12 in the server-client state monitors whether or not the remaining time becomes equal to or less than the reference time. If the remaining time becomes equal to or less than the reference time, the game machine 12 in the server-client state inhibits the execution of the processing of Step S315 of FIG. 10. Alternatively, each of the game machines 12 monitors whether or not the remaining time becomes equal to or less than the reference time. If the remaining time becomes equal to or less than the reference time, each of the game machines 12 inhibits the execution of the processing of Step S312 of FIG. 10.

In the case where the remaining time before the end of the first half or second half of the match is short, even if the execution of the switching of the server-client machine is executed, the game is to end soon, which makes it hardly necessary to execute the switching of the server-client machine. In this respect, according to this mode, it is possible to perform such setting that the server-client machine is not executed unnecessarily. As a result, it is possible to reduce a processing load on the game machine 12 in the server-client state.

Further, for example, the server determining unit 28 may determine the server-client machine based on the measurement results of the data exchange time from the measuring units 22 of the respective game machines 12 and other information.

To be more specific, if it is judged that there exist a plurality of game machines 12 with a satisfactory communication state based on the measurement results of the data exchange time from the measuring units 22 of the respective game machines 12, the server determining unit 28 may determine any one of the plurality of game machines 12 as the server-client machine based on the other information. In this case, in the processing of Step S202 of FIG. 7, the server determining unit 28 first acquires the mean response time having the smallest value (minimum mean response time) among the mean response times of the respective game machines 12 calculated in S201. After that, for each of the game machines 12, the server determining unit 28 judges whether or not a difference between the mean response time of the game machine 12 and the above-mentioned minimum mean response time is within a predetermined time. If there exist a plurality of game machines 12 having a difference between the mean response time thereof and the above-mentioned minimum mean response time within a predetermined time, the server determining unit 28 selects any one of the plurality of game machines 12 based on the information other than the mean response time, and acquires the game machine ID of the game machine 12. Note that if there exists only one game machine 12 having a difference between the mean response time thereof and the above-mentioned minimum mean response time within a predetermined time, the server determining unit 28 acquires the game machine ID of the one game machine 12.

Herein, examples of the "other information" to be used may include the processing speed of the game machine 12.

In this mode, the measuring unit 22 (processing speed measuring means) of each of the game machines 12 measures the processing speed of the game machine 12 as well. The processing speed of the game machine 12 is acquired by the measurement of a time required for executing a predetermined processing on the game machine 12. In this mode, the measuring unit 22 further includes a function of executing predetermined processing and a function of measuring a time required for completing the predetermined processing. Note that the predetermined processing represents processing performed without the intermediation of the communication network 14. Further, it is preferable that the measuring unit 22 execute the measurement of the processing speed a plurality of times.

In this mode, in the processing of Step S202 of FIG. 7, if it is judged that there exist a plurality of game machines 12 having a difference between the mean response time thereof and the above-mentioned minimum mean response time within a predetermined time, based on the measurement results of the processing speeds supplied from the measuring units 22 of the plurality of game machines 12, the server determining unit 28 acquires the game machine ID of the game machine 12 having the highest processing speed among the plurality of game machines 12.

As described above, the server-client machine updates the game situation information based on the operation information supplied from the respective game machines 12, and plays a role of returning the game situation update information indicating the update content to the other game machines 12. Therefore, the processing load on the server-client machine becomes higher than that on the client-dedicated machine. This causes a fear that if the game machine 12 having a lower processing speed becomes the server-client machine, the competitive soccer game may not be played smoothly. In this respect, according to this mode, if it is judged that there exist a plurality of game machines 12 having a satisfactory communication state, the game machine 12 having the highest processing speed among the plurality of game machines 12 is determined as a server-client machine, which makes it possible for the competitive soccer game to be played more smoothly.

The examples of the "other information" to be used may further include past game results of the player.

In this mode, in the network game system 10, information on the past game results of each player is stored. For example, the network game system 10 includes a network game management device separately from the game machine 12, and the network game management device (game result storage means) stores a game result information table as shown in FIG. 11. As shown in FIG. 11, the game result information table contains the "player ID" field and a "game result information" field. The description of the "player ID" field is the same as the case of the game machine information table (FIG. 3). Game result information relating to the game results produced by the player in the past games is stored in the "game result information" field. The game results include, for example, victory or defeat, scores, lost points, and the number of yellow cards and red cards.

In this mode, in the processing of Step S202 of FIG. 7, if it is judged that there exist a plurality of game machines having a difference between the mean response time thereof and the above-mentioned minimum mean response time within a predetermined time, the server determining unit 28 reads out the game result information corresponding to the plurality of game machines 12 from the game result information table for comparison. In other words, the server determining unit 28 reads out the game result information stored in association with the player IDs of the players corresponding to the plurality of game machines 12 from the game result information table for comparison. Then, based on the comparison results, the server determining unit 28 acquires the game machine ID of the game machine 12 corresponding to the player having the worst past game results among the plurality of game machines 12.

Note that the game result information table may be provided with the "game machine ID" field instead of the "player ID" field. The game result information relating to the game results produced in the past game by the player who played on the corresponding game machine 12 may thus be stored in the "game result information" field.

As described above, on the client-dedicated machine of the network game system 10, the game screen corresponding to an operation performed on the client-dedicated machine is display-outputted by having the data (operation information and game situation update information) exchanged with the server-client machine. This deteriorates the client-dedicated machine's response to the game operation compared to the server-client machine. Therefore, the player on the client-dedicated machine must perform the game play in a more disadvantageous state than the player of the server-client machine. In this respect, according to this mode, if it is judged that a plurality of game machines 12 having a satisfactory communication state exist, the game machine 12 corresponding to the player having the lowest past game results among the plurality of game machines 12 is determined as a server-client machine. According to this mode, an inexperienced player can play in an advantageous state, while the highly experienced player must play in a disadvantageous state, which can make a competitive game more exciting.

The examples of the "other information" to be used may further include the attribute parameters of a team (game character group) corresponding to the game machine 12 and the attribute parameters of the soccer player characters (game characters) belonging to the team corresponding to the game machine 12.

In this mode, in the processing of Step S202 of FIG. 7, if it is judged that there exist a plurality of game machines 12 having a difference between the mean response time thereof and the above-mentioned minimum mean response time within a predetermined time, the server determining unit 28 (parameter comparing means) compares the attribute parameters of the two teams or the attribute parameters of the soccer player characters belonging to the two teams in order to judge the strength of the two teams. Based on the comparison results, the server determining unit 28 acquires the game machine ID of the game machine corresponding to the weaker team among the plurality of game machines 12.

In this mode, if a plurality of game machines 12 having a satisfactory communication state exist, the game machine 12 corresponding to the weaker team is determined as a server-client machine from among the plurality of game machines 12. According to this mode, the player operating the weaker team can play in an advantageous state, while the player operating the stronger team can play in a disadvantageous state, which can make a competitive game more exciting.

Further, the server determining unit 28 may limit the determination of the server-client machine based on information other than the measurement result of the data exchange time from the measuring unit 22 of each of the game machines 12.

In this case, the examples of the "other information" include a communication disconnection count during the past game of the player or the game machine 12. In this mode, the network game system 10 stores the communication disconnection count during the past game of the player or the game machine 12. For example, the network game system 10 includes a network game management device separately from the game machine 12, and the network game management device (communication disconnection count storage means) stores a communication disconnection count table as shown in FIG. 12. As shown in FIG. 12, the communication disconnection count table contains the "player ID" field and a "communication disconnection count" field. The description of the "player ID" field is the same as the case of the game machine information table (FIG. 3). The count of times when the game machine 12 corresponding to the player comes into a communication disconnection state during the past games is stored in the "communication disconnection count" field.

The communication disconnection count is calculated as follows, for example. That is, if the execution of the competitive soccer game played with 4 game machines 12 starts, the network game management device stores a game machine information table (FIG. 3). Each of the game machines 12 monitors, during a game, whether or not a game machine 12 exists, among the other game machines 12, that has not transmitted data (operation information or game situation update information) for more than a predetermined period. If such game machine 12 exists, each of the game machines 12 transmits a connection state confirmation request data to the network game management device. Upon receipt of the connection state confirmation request data, the network game management device transmits the response request data to each of the game machines 12 based on the game machine information table. Upon receipt of the response request data, each of the game machines 12 returns the response data to the network game management device. The network game management device monitors whether or not the response data is returned from each of the game machines 12. If a game machine 12 exists that does not return the response data by the time when a predetermined time elapses after the transmission of the response request data, the network game management device judges that the game machine 12 is in a communication disconnection state. If it is judged that the game machine 12 is in a communication disconnection state, the network game management device adds "1" to the communication disconnection count stored in association with the player ID of the player corresponding to the game machine 12.

In this mode, in the processing of Step S202 of FIG. 7, after acquiring the game machine ID of the game machine 12 having the shortest mean response time, the server determining unit 28 reads out the communication disconnection count corresponding to the game machine ID from the communication disconnection count table. In other words, after acquiring the player ID stored in association with the game machine ID from the game machine information table, the server determining unit 28 reads out the communication disconnection count stored in association with the player ID from the communication disconnection count table. Subsequently, the server determining unit 28 judges whether or not the read out communication disconnection count is equal to or larger than a predetermined reference count. If the read out communication disconnection count is equal to or larger than the predetermined reference count, the server determining unit 28 acquires the game machine ID of the game machine 12 having the second shortest mean response time, and repeats the same processing. On the other hand, if the read out communication disconnection count is less than the predetermined reference count, the server determining unit 28 executes the processing of Step S203.

Note that the communication disconnection count table may be provided with the "game machine ID" field instead of the "player ID" field. The count of the times when the game machine 12 comes into a communication disconnection state during the past game may thus be stored in the "communication disconnection count" field.

In the competitive soccer game as described according to this embodiment, if a difference in the score has increased to a certain degree, the player on the losing side may deliberately disconnect the communication connection during the game to give up playing the game. At this time, if the game machine 12 corresponding to the player is a client-dedicated machine, the soccer player character which is supposed to be operated by the player may be operated by a computer (server-client machine) in place of the player for continuation of the game. However, if the game machine 12 corresponding to the player is a server-client machine, none of the client-dedicated machines can any longer acquire the game situation update information, which makes it difficult to continue the game. In this respect, according to this mode, in a case where the communication disconnection count during the past game of a game machine 12 or a player is equal to or larger than a predetermined reference count, even if the communication state of that game machine 12 or the game machine 12 corresponding to that player is satisfactory, that game machine 12 or the game machine 12 corresponding to that player is not determined as a server-client machine. According to this mode, the probability of it becoming difficult to continue the game due to such an undesired action as described can be reduced above.

Further, for example, the present invention is not necessarily applied to the network game system for providing the soccer game. The present invention can also be applied to network game systems for providing sports games using a ball other than the soccer game, sports games other than the sports games using a ball, and other types of game (such as a fighting game and a Mahjong game).

The invention claimed is:

1. A network game system, which comprises a plurality of game machines and provides a game played by players that respectively correspond to the plurality of game machines by operating at least one of the plurality of game machines as a server, wherein:
    each of the plurality of game machines includes a measuring unit that measures a time required for exchanging predetermined data between the game machine and another one of the plurality of game machines;
    the network game system further comprises:
    a server determining unit that determines at least one of the plurality of game machines as the game machine to be operated as the server based on a measurement result from the measuring unit of each of the plurality of game machines; and
    a network game management device that stores a communication disconnection count during a past game in association with identification information for identifying the game machine or the player,
    wherein the server determining unit determines at least one of the plurality of game machines as the game machine to be operated as the server based on the measurement result from the measuring unit of each of the plurality of game machines and a storage content of the network game management device, and
    wherein a predetermined situation comprises one of an out of play state and a time within a predetermined reference time of a start of the out-of-play state.

2. A network game system according to claim 1, wherein:
    the measuring unit comprises a response requesting unit that transmits response request data to the another one of the plurality of game machines;
    each of the plurality of game machines further includes a responding unit that transmits, in the case of receipt of the response request data transmitted from the response requesting unit of another one of the plurality of game machines, response data corresponding to the response request data to the another game machine; and
    the measuring unit measures a time elapsing from transmission of the response request data by the response requesting unit until receipt of the response data corresponding to the response request data.

3. A network game system according to claim 1, wherein:
    measurement by the measuring unit is executed a plurality of times;
    the network game system further includes a statistical information acquiring unit that acquires statistical information of the measurement result from the measuring unit; and
    the server determining unit determines at least one of the plurality of game machines as the game machine to be operated as the server based on the statistical information acquired by the statistical information acquiring unit.

4. A network game system according to claim 1, further comprising a game situation information storage unit that stores game situation information indicating a situation of the game which is updated based on an operation content of each of the plurality of game machines, wherein:
    measurement by the measuring unit is repeatedly executed for each of the plurality of game machines after the game is started; and
    the server determining unit is configured to,
    judge whether the situation of the game is the predetermined situation after the game is started based on the game situation information stored in the game situation information storage unit,
    select at least one of the plurality of game machines as the game machine to be operated as the server after the game is started based on the measurement result from the measuring unit of each of the plurality of game machines, and
    switch the game machine to be operated as the server into the selected game machine if it is judged that the situation of the game is the predetermined situation.

5. A network game system according to claim 4, wherein:
    the game ends in the case where a time limit is reached after the game is started; and
    one of the plurality of game machines monitors whether a remaining time before the game ends becomes equal to or less than a reference time, and limits execution of switching of the game machine to be operated as the server if the remaining time before the game ends becomes equal to or less than the reference time.

6. A network game system according to claim 1, wherein:
in each of the plurality of game machines the measuring unit measures a processing speed of the game machine; and
the server determining unit determines at least one of the plurality of game machines as the game machine to be operated as the server based on the measurement result from the measuring unit of each of the plurality of game machines and the processing speed of each of the plurality of game machines.

7. A network game system according to claim 1, further comprising a network game management device that stores a game result of a past game in association with identification information for identifying the game machine or the player,
wherein the server determining unit determines at least one of the plurality of game machines as the game machine to be operated as the server based on the measurement result from the measuring unit of each of the plurality of game machines and a storage content of the network game management device.

8. A network game system according to claim 1, wherein:
the game has a game character or a game character group corresponding to each of the plurality of game machines appearing therein; and
the server determining unit performs a comparison, for each of the plurality of game machines, between an attribute parameter of the game character or the game character group corresponding to the game machine and an attribute parameter of the game character or the game character group corresponding to the another one of the plurality of game machines, and determines at least one of the plurality of game machines as the game machine to be operated as the server based on the measurement result from the measuring unit of each of the plurality of game machines and a result of the comparison.

9. A network game system including a plurality of game machines and provides a game played by players that respectively correspond to the plurality of game machines by operating at least one of the plurality of game machines as a server, comprising:
a server determining unit that acquires, for each of the plurality of game machines, a measurement result of a time required for exchanging predetermined data between the game machine and another one of the plurality of game machines, and determines at least one of the plurality of game machines as the game machine to be operated as the server based on the acquired measurement result and a storage content of a network game management device, wherein the network game management device stores a communication disconnection count during a past game in association with identification information for identifying the game machine or the player, and
wherein a predetermined situation comprises one of an out of play state and a time within a predetermined reference time of a start of the out-of-play state.

10. A control method for a game machine included in a network game system which includes a plurality of game machines and provides a game played by players that respectively correspond to the plurality of game machines by operating at least one of the plurality of game machines as a server, including a processor configured to perform the control method comprising:
a data exchange time measurement result acquiring step of acquiring, for each of the plurality of game machines, a measurement result of a time required for exchanging predetermined data between the game machine and another one of the plurality of game machines; and
a server determining step of determining at least one of the plurality of game machines as the game machine to be operated as the server based on the measurement result acquired by the data exchange time measurement result acquiring step,
wherein the server determining step includes determining at least one of the plurality of game machines as the game machine to be operated as the server based on the measurement result acquired by the data exchange time measurement result acquiring step and a storage content of a network game management device,
wherein the network game management device stores a communication disconnection count during a past game in association with identification information for identifying the game machine or the player, and
wherein a predetermined situation comprises one of an out of play state and a time within a predetermined reference time of a state of the out-of-play state.

11. A non-transitory computer-readable information storage medium recorded with a program for causing a computer to function as a game machine included in a network game system which includes a plurality of game machines and provides a game played by players that respectively correspond to the plurality of game machines by operating at least one of the plurality of game machines as a server,
the program further causing the computer to function as:
a server determining unit for acquiring, for each of the plurality of game machines, a measurement result of a time required for exchanging predetermined data between the game machine and another one of the plurality of game machines, and determining at least one of the plurality of game machines as the game machine to be operated as the server based on the acquired measurement result and a storage content of a network game management device, wherein the network game management device stores a communication disconnection count during a past game in association with identification information for identifying the game machine or the player, and
wherein a predetermined situation comprises one of an out of play state and a time within a predetermined reference time of a start of the out-of-play state.

12. A network game system according to claim 2, wherein:
measurement by the measuring unit is executed a plurality of times;
the network game system further includes a statistical information acquiring unit that acquires statistical information of the measurement result from the measuring unit; and
the server determining unit determines at least one of the plurality of game machines as the game machine to be operated as the server based on the statistical information acquired by the statistical information acquiring unit.

13. A network game system according to claim 2, further comprising game situation information storage unit that stores game situation information indicating a situation of the game which is updated based on an operation content of each of the plurality of game machines, wherein:
measurement by the measuring unit is repeatedly executed for each of the plurality of game machines after the game is started; and the server determining unit is configured to, judge whether the situation of the game is a predetermined situation after the game is started based on the game situation information stored in the game situation information storage unit, select at least one of the plurality of game machines as the game machine to be operated as the server after the game is started based on the measurement result from the measuring unit of each of the plurality of game machines, and the game machine to be operated as the server into the selected game machine if it is judged that the situation of the game is the predetermined situation.

14. A network game system according to claim 2, wherein:

in each of the plurality of game machines the measuring unit measures a processing speed of the game machine; and the server determining unit determines at least one of the plurality of game machines as the game machine to be operated as the server based on the measurement result from the measuring unit of each of the plurality of game machines and the processing speed of each of the plurality of game machines.

15. A network game system according to claim 2, further comprising a network game management device that stores a game result of a past game in association with identification information for identifying the game machine or the player, wherein the server determining unit determines at least one of the plurality of game machines as the game machine to be operated as the server based on the measurement result from the measuring unit of each of the plurality of game machines and a storage content of the network game management device.

16. A network game system according to claim 2, wherein:

the game has a game character or a game character group corresponding to each of the plurality of game machines appearing therein; and the server determining unit performs a comparison, for each of the plurality of game machines, between an attribute parameter of the game character or the game character group corresponding to the game machine and an attribute parameter of the game character or the game character group corresponding to the another one of the plurality of game machines, and determines at least one of the plurality of game machines as the game machine to be operated as the server based on the measurement result from the measuring unit of each of the plurality of game machines and a result of the comparision.

* * * * *